US006975994B2

(12) United States Patent
Black et al.

(10) Patent No.: US 6,975,994 B2
(45) Date of Patent: Dec. 13, 2005

(54) DEVICE FOR PROVIDING SPEECH DRIVEN CONTROL OF A MEDIA PRESENTATION

(75) Inventors: Sarah Leslie Black, El Granada, CA (US); Michael L. Weiner, Webster, NY (US)

(73) Assignee: Technology Innovations, LLC, West Henrietta, NY (US)

( * ) Notice: Subject to any disclaimer, the term of this patent is extended or adjusted under 35 U.S.C. 154(b) by 730 days.

(21) Appl. No.: 09/951,327

(22) Filed: Sep. 12, 2001

(65) Prior Publication Data

US 2005/0038660 A1 Feb. 17, 2005

(51) Int. Cl.[7] ............................................. G10L 21/00
(52) U.S. Cl. ..................... 704/275; 704/235; 704/2; 704/271; 381/43; 84/609
(58) Field of Search ................................. 704/275, 235, 704/2, 271; 381/43; 364/188; 84/609

(56) References Cited

U.S. PATENT DOCUMENTS

| | | | |
|---|---|---|---|
| 4,813,076 A * | 3/1989 | Miller | 704/254 |
| 4,931,950 A | 6/1990 | Isle et al. | |
| 5,208,745 A | 5/1993 | Quentin et al. | |
| 5,345,538 A | 9/1994 | Narayannan et al. | |
| 5,600,765 A | 2/1997 | Ando et al. | |
| 5,878,394 A * | 3/1999 | Muhling | 704/275 |
| 6,232,539 B1 * | 5/2001 | Looney et al. | 84/609 |
| 2002/0099534 A1 * | 7/2002 | Hegarty | 704/2 |
| 2002/0161578 A1 * | 10/2002 | Saindon et al. | 704/235 |
| 2002/0194005 A1 * | 12/2002 | Lahr | 704/271 |
| 2004/0128137 A1 * | 7/2004 | Bush et al. | 704/275 |

OTHER PUBLICATIONS www. synsolutions.com/ software/ slideshowcommander/ manuals/SlideShowCommand, "SlideShow Commander" Version 1.0, Synergy Solutions, Inc.

* cited by examiner

Primary Examiner—W. R. Young
Assistant Examiner—Jakieda Jackson
(74) Attorney, Agent, or Firm—Basch & Nickerson LLP; Michael J. Nickerson

(57) ABSTRACT

A speech-driven control device for a media system includes a housing; a controller; a first communication port to enable communication of instructions between a data processing system and the controller; and a second communication port to enable communication of instructions between a media device and the controller. The controller includes a speech recognition system to recognize human speech and to convert the human speech into a first set of commands and into a second set of commands. The first set of commands provides instructions to the data-processing system to enable speech driven control of a media presentation. The second set of commands provides instructions to the media device to enable speech driven control of a functionality of the media device.

12 Claims, 4 Drawing Sheets

DEVICE FOR PROVIDING SPEECH DRIVEN CONTROL OF A MEDIA PRESENTATION

FIELD OF THE PRESENT INVENTION

The present invention relates generally to providing speech driven control of a media presentation. More particularly, the present invention relates to providing a device that recognizes speech commands and controls a media presentation in response to the recognized speech commands.

BACKGROUND OF THE PRESENT INVENTION

Conventionally, as illustrated in FIG. 1, media presentations have been realized by connecting a data processing system 1, such as a laptop computer or a personal computer, to a multi-media device 7. The data processing system 1 is connected to the multi-media device 7 via a cable 13. The multi-media device 7 includes an audio system 8 and an imaging system 6 that projects an image 9.

A multi-media presentation is stored in the data processing system 1. This multi-media presentation can be a slide presentation of images, animation, a video clip, and/or an audio clip. The desired image, video, animation or audio (informational data) is selected on the data processing system 1 through either a keyboard input device 3 or a pointing device 5, such as a mouse, touch pad, or trackball. The selected informational data is transferred from the data processing system 1 to the multi-media device 7 via cable 13 in response to commands entered via the keyboard input device 3 or the pointing device 5.

The multi-media device 7 then processes the selected informational data such audio information is reproduced by the audio system 8 and image information is reproduced by the imaging system 6. In this manner, a multi-media presentation can be realized.

However, it is noted that in these conventional devices, a data processing system operator is required to select the appropriate informational data and to facilitate its transfer to the media device 7 at the correct time. This operator can either be the presenter or another person who waits for clues or instructions from the presenter as to what informational data to select and when to transfer it to the multi-media device 7.

This conventional system has the disadvantage in that the presenter needs to coordinate both the presentation of the multi-media material and the presenter's material through physical manipulation of the keyboard or pointing device of the data processing system or the presenter must interrupt the presentation to instruct an operator as to what should be selected and transferred to the multi-media device, thereby giving opportunity for human error in selecting the informational data as well as in the timing of the presentation of this material resulting in an error-prone, ineffective, and choppy presentation.

Therefore, it is desirable to have a media presentation system that enables the selection and reproduction of informational data without requiring the presenter or another operator to physically manipulate the keyboard or pointing device of the data processing system. Moreover, it is desirable to have a media presentation system that automatically selects and reproduces the proper informational data in response to the voice or speech of the presenter.

The present invention provides a media presentation system that significantly reduces or eliminates the disadvantages associated with conventional techniques. More specifically, the present invention utilizes speech recognition to generate selection commands, reproduction commands, and media device parameter commands. Also, the present invention eliminates the need for a separate operator to operate the data processing system. Lastly, the present invention provides a more reliable selection and reproduction over the conventional techniques.

SUMMARY OF THE PRESENT INVENTION

One aspect of the present invention is a media system. The media system includes a data-processing system to provide informational data and a media device, communicatively connected to the data processing system, to convert the informational data from the data processing system into information that is human-perceivable. The media device includes a speech recognition system to recognize human speech and to convert predetermined portions of the received human speech into commands, the commands providing instructions to the data-processing system to enable speech driven control of a media presentation, and an imaging system to display images from the informational data.

Another aspect of the present invention is a media device. The media device includes an imaging system to convert informational data from a data processing system into information that is human-perceivable and a speech recognition system to recognize human speech and to convert predetermined portions of the received human speech into commands, the commands enabling speech driven control of a media presentation.

A third aspect of the present invention is a speech-driven control device for a media system. The speech-driven control device includes a housing; a controller; a first communication port to enable communication of instructions between a data processing system and the controller; and a second communication port to enable communication of instructions between a media device and the controller. The controller includes a speech recognition system to recognize human speech and to convert the human speech into a first set of commands and into a second set of commands, the first set of commands providing instructions to the data-processing system to enable speech driven control of a media presentation, the second set of commands providing instructions to the media device to enable speech driven control of a functionality of the media device.

A fourth aspect of the present invention is a method of preparing a media presentation to be controlled using speech commands. The method creates an electronic media presentation file, the electronic media presentation file being formed of a plurality of segments, each segment being a specifically defined portion of the electronic media presentation file; creates a distinct speech dependent electronic file tag for the electronic media presentation file; assigns the distinct speech dependent electronic file tag to the electronic media presentation file, the distinct speech dependent electronic file tag uniquely identifying the electronic media presentation file; creates a distinct speech dependent electronic segment tag for each segment; assigns a distinct speech dependent electronic segment tag to each segment, the distinct speech dependent electronic segment tag uniquely identifying an associated segment; creates distinct speech dependent electronic commands; and assigns each distinct speech dependent electronic command to an electronic instruction.

A further aspect of the present invention is a media system. The media system includes a personal digital assistant device having a digital file stored therein and a media device, in communication with the personal digital assistant device, to convert the digital file from the personal digital assistant device into information that is human-perceivable.

A sixth aspect of the present invention is a media system. The media system includes a data-processing subsystem to provide informational data; a media subsystem to convert the informational data from the data processing system into information that is human-perceivable; and a speech recognition subsystem to recognize human speech and to convert predetermined portions of the received human speech into commands. The commands provide instructions to the data-processing subsystem to enable speech driven control of a media presentation.

BRIEF DESCRIPTION OF THE DRAWINGS

The present invention may take form in various components and arrangements of components, and in various steps and arrangements of steps. The drawings are only for purposes of illustrating a preferred embodiment or embodiments and are not to be construed as limiting the present invention, wherein.

DETAILED DESCRIPTION OF THE PRESENT INVENTION

Figure 1:
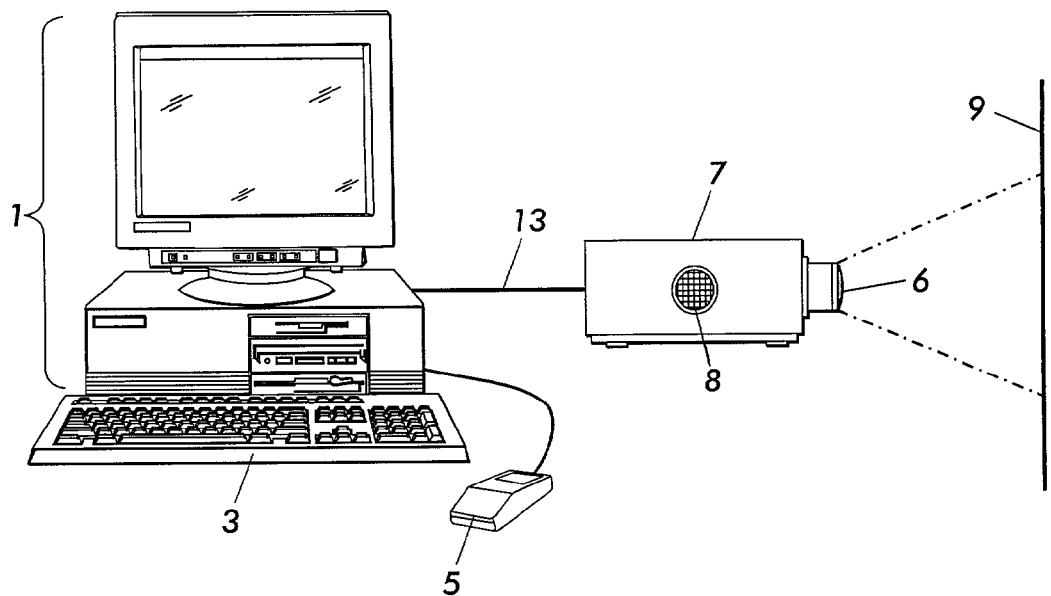
FIG. 1 is a block diagram showing a prior art media presentation system.
Figure 2:
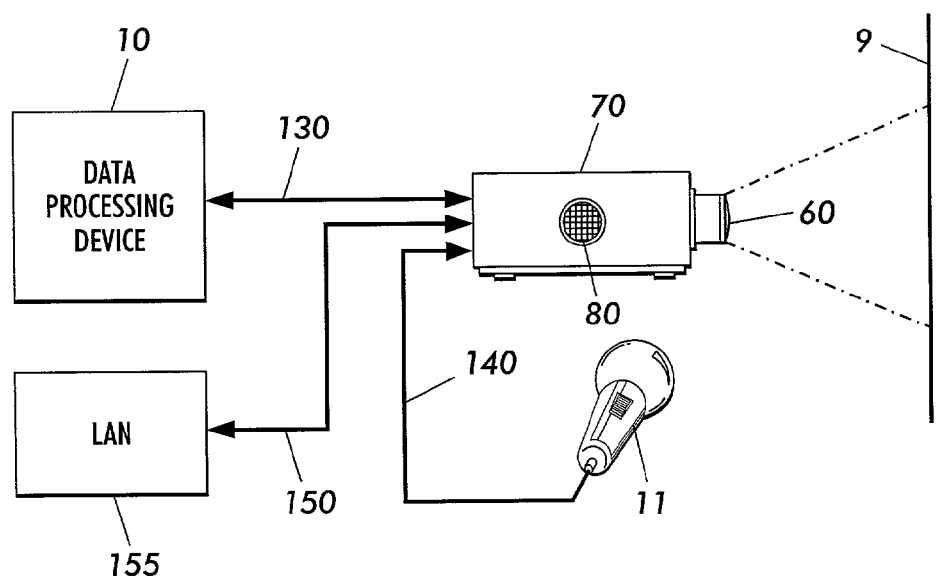
FIG. 2 is a block diagram showing a media presentation system according to one embodiment of the present invention.

As noted above, the present invention is directed to a system for a enabling a media presentation via speech commands. FIG. 2 is a block diagram showing one embodiment of the present invention.

As illustrated in FIG. 2, a data processing device 10 is connected to a media device 70 via a bi-directional communication channel 130. The data processing device 10 may be a personal computer, central processor, a laptop computer, a personal digital assistant (PDA), CD-ROM device, digital video device, or other device capable of storing images and/or audio informational data and transferring such informational data via a communication channel to a media device for reproduction in response to electronic commands or instructions.

The bi-directional communication channel 130 may be a cable providing electronic communication; a combination of cables (parallel, serial, PS/1, or universal serial bus cables) for providing, separately or in sub-combination, video, audio, and command signals; a fiber optic cable for providing light pulse communication; two or more infrared sensors and infrared light sources for providing infrared communications, two or more radio transmitter/receivers for providing radio communication, or other form of communication channel that provides bi-directional communication between the data processing device 10 and the media device 70.

The media device 70 is further connected to network 155, such as a local area network or wide area network, via a cable 150. This connection enables the media device 70 to connect directly to a network, such the World Wide Web and retrieve, therefrom, informational data directly.

The media device 70 includes an audio input device 11, such as a microphone, that is communicatively connected to the media device 70 via a communication channel 140. The communication channel 140 may be a cable for providing a direct electrical connection between the audio input device 11 and the media device 70, or the communication channel 140 may be a fiber optic cable or a radio transmitter and corresponding receiver.

The audio input device 11 enables the presenter to input voice commands and oral presentation information to the media device 70. The voice commands provide instructions to the data processing device 10 for retrieving and transferring informational data, instructions to the media device 70 to adjust the parameters of the media device 70, and to instruct the media device 70 to retrieve informational data from a connected network 155.

Examples speech commands for the data processing device 10 are a next slide command (i.e., "display next NNNN slide"), a previous slide command (i.e., "display previous NNNN slide"), a retrieve file command (i.e., "retrieve NNNN file"), a start video command (i.e., "start NNNN video"), a pause video command (i.e., "pause NNNN video"), a stop video command (i.e., "stop NNNN video"), an advance back video command (i.e., "back frame NNNN video"), an advance forward video command (i.e., "next frame NNNN video"), a start audio command (i.e., "start NNNN audio"), a pause audio command (i.e., "pause NNNN audio"), a stop audio command (i.e., "stop NNNN audio"), an advance back audio command (i.e., "back NNNN audio"), and an advance forward audio command (i.e., "forward NNNN audio"). These examples may be realized by the presenter saying the quoted phrases with an associated predetermined naming structure (NNNN) into the audio input device 11.

Examples speech commands for the media device 70 are focus commands (i.e., "focus image plus", "focus image negative"), sharpness commands (i.e., "increase image sharpness", "decrease image sharpness"), color commands (i.e., "increase red", "decrease red"), brightness commands (i.e., "increase image brightness", "decrease image brightness"), display shift commands (i.e., "shift image left", "shift image right", "shift image up", "shift image down"), and audio commands (i.e., "increase volume", "decrease volume", "decrease bass", "increase bass", "increase treble", "decrease treble"). These examples may be realized by the presenter saying the quoted phrases into the audio input device 11.

The oral presentation information is audio information that the presenter is conveying directly to the audience. This oral presentation information is reproduced by the audio system 80.

Image informational data retrieve from the data processing device 10 or the network 155 is reproduced by an imaging system 60 and is projected as an image 9. The imaging system 60 may be an image projection system or a direct video display system such a cathode ray tube or other type of display device.

Figure 3:
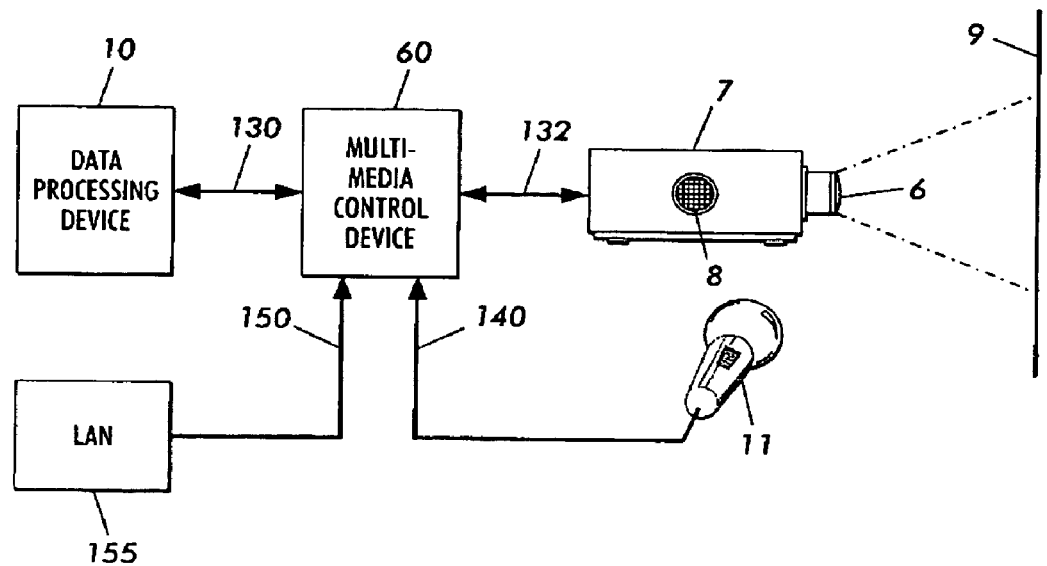
FIG. 3 is a block diagram showing a media presentation system according to another embodiment of the present invention.

FIG. 3 illustrates another embodiment of the present invention. As illustrated in FIG. 3, a conventional data processing device 10 is connected to a media control device 60 via a bi-directional communication channel 130. The media control device 60 is a module or self-contained unit that is connected between a conventional data processing device 10 and a conventional media device 7.

The data processing device 10 may be a personal computer, central processor, a laptop computer, a personal digital assistant, CD-ROM device, digital video device, or other device capable of storing images and/or audio informational data and transferring such informational data via a communication channel to a media device for reproduction in response to electronic commands or instructions.

The bi-directional communication channel 130 may be a cable providing electronic communication; a combination of cables (parallel, serial, PS/1, or universal serial bus cables) for providing, separately or in sub-combination, video, audio, and command signals; a fiber optic cable for providing light pulse communication; two or more infrared sensors and infrared light sources for providing infrared communications, two or more radio transmitter/receivers for providing radio communication, or other form of communication channel that provides bidirectional communication between the data processing device 10 and the media control device 60.

The media control device 60 is further connected to network 155, such as a local area network or wide area network, via a cable 150. This connection enables the media device 60 to connect directly to a network, such the World Wide Web and retrieve, therefrom, informational data directly.

The media control device 60 includes an audio input device 11, such as a microphone, that is communicatively connected to the media control device 60 via a communication channel 140. The communication channel 140 may be a cable for providing a direct electrical connection between the audio input device 11 and the media control device 60, or the communication channel 140 may be a fiber optic cable or a radio transmitter and corresponding receiver.

The audio input device 11 enables the presenter to input speech commands and oral presentation information to the media device 7 via the media control device 60 and communication channel 132. The communication channel 132 may be a cable providing electronic communication; a combination of cables (parallel, serial, PS/1, or universal serial bus cables) for providing, separately or in sub-combination, video, audio, and command signals; a fiber optic cable for providing light pulse communication; two or more infrared sensors and infrared light sources for providing infrared communications, two or more radio transmitter/receivers for providing radio communication, or other form of communication channel that provides bi-directional communication between the media control device 60 and the media device 7.

The speech commands provide instructions to the data processing device 10 for retrieving and transferring informational data, instructions to the media device 7 to adjust the parameters of the media device 7, and instructions to instruct the media control device 60 to retrieve informational data from a connected network 155.

Examples speech commands for the data processing device 10 are a next slide command (i.e., "display next NNNN slide"), a previous slide command (i.e., "display previous NNNN slide"), a retrieve file command (i.e., "retrieve NNNN file"), a start video command (i.e., "start NNNN video"), a pause video command (i.e., "pause NNNN video"), a stop video command (i.e., "stop NNNN video"), an advance back video command (i.e., "back frame NNNN video"), an advance forward video command (i.e., "next frame NNNN video"), a start audio command (i.e., "start NNNN audio"), a pause audio command (i.e., "pause NNNN audio"), a stop audio command (i.e., "stop NNNN audio"), an advance back audio command (i.e., "back NNNN audio"), and an advance forward audio command (i.e., "forward NNNN audio"). These examples may be realized by the presenter saying the quoted phrases with an associated predetermined naming structure (NNNN) into the audio input device 11.

Examples speech commands for the media device 7 are focus commands (i.e., "focus image plus", "focus image negative"), sharpness commands (i.e., "increase image sharpness", "decrease image sharpness"), color commands (i.e., "increase red", "decrease red"), brightness commands (i.e., "increase image brightness", "decrease image brightness"), display shift commands (i.e., "shift image left", "shift image right", "shift image up", "shift image down"), and audio commands (i.e., "increase volume", "decrease volume", "decrease bass", "increase bass", "increase treble", "decrease treble"). These examples may be realized by the presenter saying the quoted phrases intx the audio input device 11.

The oral presentation information is audio information that the presenter is conveying directly to the audience. This oral presentation information is reproduced by the audio system 8.

Image informational data retrieve from the data processing device 10 or the network 155 is reproduced by an imaging system 6 and is projected as an image 9. The imaging system 6 may be an image projection system or a direct video display system such a cathode ray tube or other type of display device.

Figure 5:
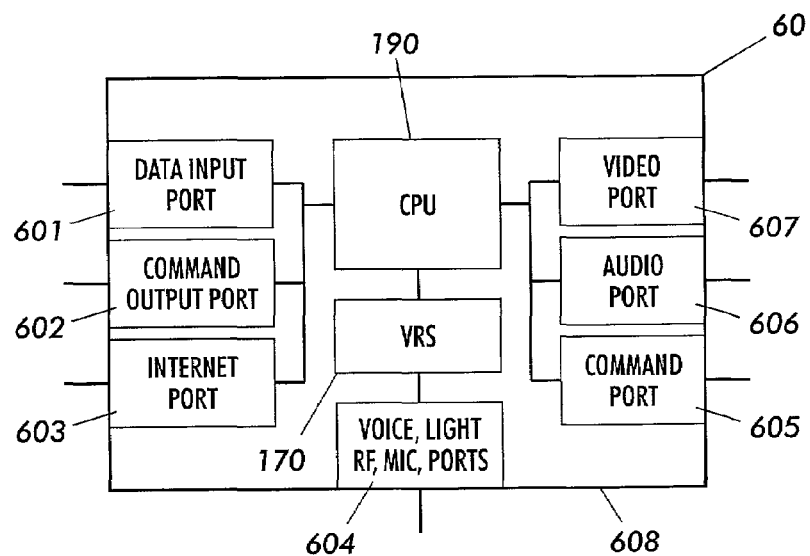
FIG. 5 is a block diagram showing a media control device according to one embodiment of the present invention.

FIG. 5 illustrates further detail of the media control device 60. As illustrated in FIG. 5, the media control device 60 includes a housing 608. Within the housing 608, the media control device 60 includes a data input port 601 to receive informational data from the data processing device 10 and a command output port 602 for providing commands and instructions to the data processing device 10. The media control device 60 further includes an Internet port 603.

A multitude of ports 604 are provided to receive voice, light pulses, radio frequencies, infrared light, and a remote microphone. These ports 604 enable the receiving the voice of the presenter in a flexible manner, thereby allowing the presenter to convey the presenter's voice to the media control device 60 in a variety of forms. Other ports include a video output port 607 (connected to a media device 7), an audio output port 606 (connected to a media device 7), and a command port 605 (connected to a media device 7).

The media control device 60 includes a processor 190 that controls the media control device 60, controls the transferring of informational data between the media device 7 and the data processing device 10, and controls the generation of instructions for the media device 7 and the data processing device 10. The processor 190 is connected to ports 601. 602, 603, 607, 606, and 605. A speech recognition system ("SRS") 170 is connected to the processor 190. The SRS 170 may be a hardwired logic circuit or a software application riding upon the processor.

The SRS 170 monitors the input from ports 604 to identify predetermined speech commands and predetermined voice file names. Upon proper identification of a predetermined speech command and associated predetermined speech file name, the SRS 170 sends instruction to the processor 190 indicating the identification of a predetermined speech command and associated predetermined speech file name in parallel to the speech/audio data.

The processor 190 processes the instruction from the SRS 170 and sends appropriate commands to the data processing device 10, network 150, or media device 7. Moreover, the parallel speech/audio data is sent to the audio port 606 for reproduction by the audio system 8 of media device 7.

Figure 6:
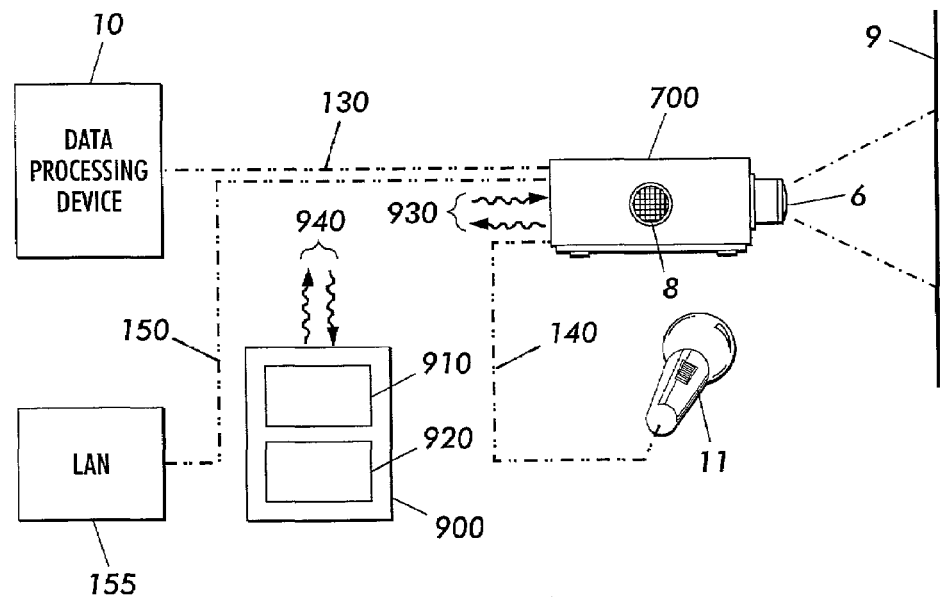
FIG. 6 is a block diagram showing a media presentation system according to a third embodiment of the present invention.

FIG. 6 is a block diagram showing a further embodiment of the present invention. As illustrated in FIG. 6, a personal digital assistant device 900 is communicatively connected to a media device 700 through communication channels 930 and 940. In a preferred embodiment, the communication channels 930 and 940 are infrared communication channels; however, the communication channels 930 and 940 may be any light, radio frequency, or hardwired communication channel.

The personal digital assistant 900 includes an input portion 920, such as a keyboard or a touch input screen, and a display portion 910. The personal digital assistant 900 has stored therein files or images or possibly audio clips that can be transferred to the media device 700 for reproduction. Moreover, the personal digital assistant 900 may have stored therein iconic file links that can be transferred to the media device 700, and the media device 700 can process the received iconic link to retrieve an associated file for reproduction by the media device 700.

Optionally, a data processing device 10 can be connected to the media device 700 via a bi-directional communication channel 130. The data processing device 10 may be a personal computer, central processor, a laptop computer, another personal digital assistance, CD-ROM device, digital video device, or other device capable of storing images and/or audio informational data and transferring such informational data via a communication channel to a media device for reproduction in response to electronic commands or instructions.

The bidirectional communication channel 130 may be a cable providing electronic communication; a combination of cables (parallel, serial, PS/1, or universal serial bus cables) for providing, separately or in sub-combination, video, audio, and command signals; a fiber optic cable for providing light pulse communication; two or more infrared sensors and infrared light sources for providing infrared communications, two or more radio transmitter/receivers for providing radio communication, or other form of communication channel that provides bidirectional communication between the data processing device 10 and the media device 700.

Optionally, the media device 700 may further be connected to a network 155, such as a local area network or wide area network, via a cable 150. This connection enables the media device 700 to connect directly to a network, such the World Wide Web and retrieve, therefrom, informational data directly.

Furthermore, The media device 700 may include an audio input device 11, such as a microphone, that is communicatively connected to the media device 700 via a communication channel 140. The communication channel 140 may be a cable for providing a direct electrical connection between the audio input device 11 and the media device 700, or the communication channel 140 may be a fiber optic cable or a radio transmitter and corresponding receiver.

The audio input device 11 enables the presenter to input speech commands and oral presentation information to the media device 700. The speech commands provide instructions to the data processing device 10 for retrieving and transferring informational data, instructions to the media device 700 to adjust the parameters of the media device 700, and to instruct the media device 700 to retrieve informational data from a connected network 155. The oral presentation information is audio information that the presenter is conveying directly to the audience. This oral presentation information is reproduced by the audio system 8.

Image informational data retrieve from the data processing device 10 or the network 155 is reproduced by an imaging system 6 and is projected as an image 9. The imaging system 6 may be an image projection system or a direct video display system such a cathode ray tube or other type of display device.

Referring back to FIG. 3, the media control device 60 of FIG. 3 can be programmed with predetermined speech commands and predetermined file names. In the process for pre-programming of the media control device 60, a presenter or other individual creates an electronic media presentation file, the electronic media presentation file being formed of a plurality of segments, each segment being a specifically defined portion of the electronic media presentation file. The presenter creates a distinct speech tag, and the media control device 60 creates a speech dependent electronic file tag for the electronic media presentation file. The media control device 60 assigns the distinct speech dependent electronic file tag to the electronic media presentation file. The distinct speech dependent electronic file tag uniquely identifies the electronic media presentation file.

The presenter creates a distinct speech tag, and the media control device 60 creates a speech dependent electronic segment tag for each segment. The media control device 60 assigns the distinct speech dependent electronic segment tag to each segment. The distinct speech dependent electronic segment tag uniquely identifies an associated segment.

The presenter creates distinct speech tags; the media control device 60 creates speech dependent electronic commands; and the media control device 60 assigns each distinct speech dependent electronic command to an electronic instruction.

The electronic media file may be a slide presentation file, a video file, an animation file, and an audio file, and the segments may correspond to individual slides, individual video clips, individual animation clips, and individual audio clips. Each file may be assigned a distinct speech tag and each segment may be assigned a distinct speech tag.

Figure 4:
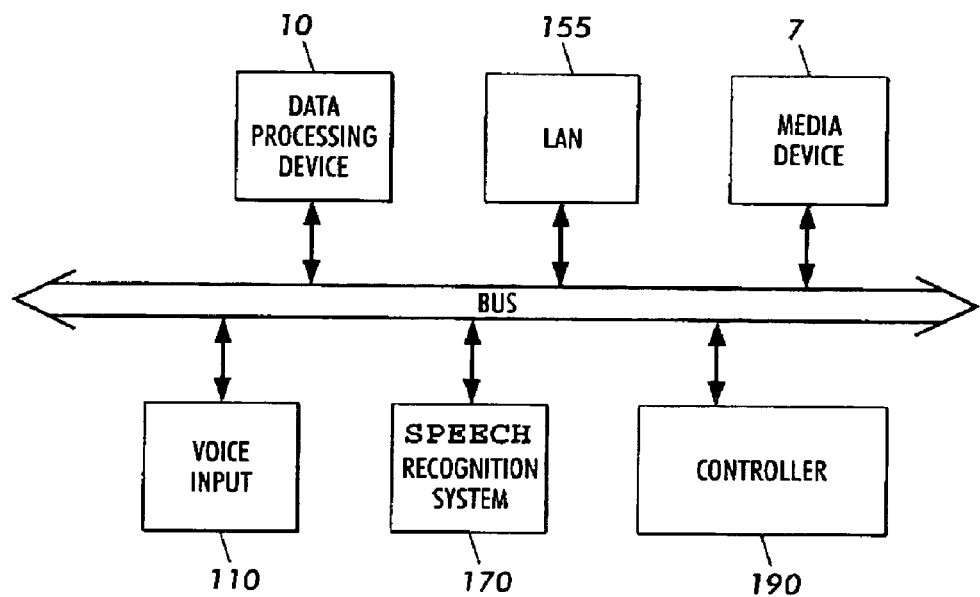
FIG. 4 illustrates an overall architecture for a media presentation system according to the concepts of the present invention.

FIG. 4 illustrates an example of a basic architecture for the present invention. As illustrated in FIG. 4, a media speech controlled architecture includes a data processing device 10, a media device 7, a voice input 110, a speech recognition system ("SRS") 170, a controller 190, and a network 155 are commonly connected through a common bus.

The processor 190 controls the transferring of informational data between the media device 7 and the data processing device 10 and controls the generation of instructions for the media device 7 and the data processing device 10. A speech recognition system ("SRS") 170 is connected to the processor 190.

The SRS 170 monitors the input from ports 604 to identify predetermined speech commands and predetermined speech file names. Upon proper identification of a predetermined speech command and associated predetermined speech file name, the SRS 170 sends instruction to the processor 190 indicating the identification of a predetermined speech command and associated predetermined speech file name in parallel to the speech/audio data.

The processor 190 processes the instruction from the SRS 170 and sends appropriate commands to the data processing device 10, network 150, or media device 7. Moreover, the parallel speech/audio data is sent to the audio port 606 for reproduction by the audio system 8 of media device 7.

Figure 7:
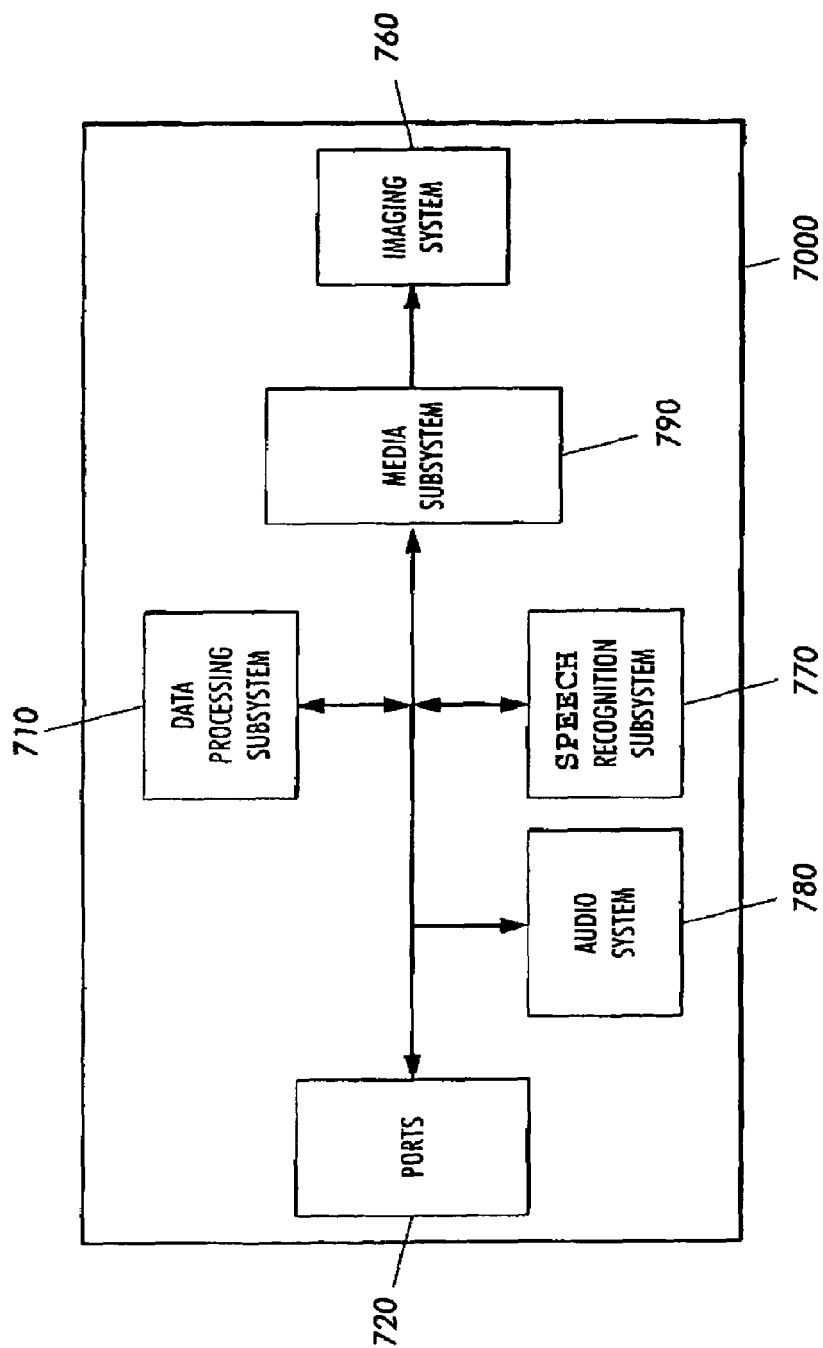
FIG. 7 is a block diagram showing a media presentation system according to a third embodiment of the present invention.

FIG. 7 is a block diagram showing a further embodiment of the present invention. As illustrated in FIG. 7, a media system 7000 includes a data processing subsystem 710 is connected to a media subsystem 790 via a bi-directional communication channel. The data processing device 710 includes a processor and memory to enable the storage and processing and transferring of informational data to the media subsystem 790. The media subsystem 790 may include a master controller for controlling the operations of the media system 7000. The data processing device 710 may also include a CD-ROM device, a CD-RW device, DVD device, floppy disk drive, a zip drive, a tape drive, or other device for receiving informational data from a portable/removable memory.

The data processing device 710 is connected to ports 720 via the bi-directional communication channel. The ports 720 enable the media system 7000 to be connected to a network, a laptop, a personal computer, a personal digital assistant device, a microphone, a digital video device, or other device capable of storing images and/or audio informational data and transferring such informational data via a communication channel. Ports 720 also enable the media system 7000 to control an attached network browser, a laptop, a personal computer, a personal digital assistant device, a digital video device, an audio device, or other device capable of storing images and/or audio informational data and transferring such informational data via a communication channel.

The ports 720 may include ports for connecting a cable providing electronic communication; a combination of cables (parallel, serial, PS/1, or universal serial bus cables) for providing, separately or in sub-combination, video, audio, and command signals; a fiber optic cable for providing light pulse communication; two or more infrared sensors and infrared light sources for providing infrared communications, two or more radio transmitter/receivers for providing radio communication, or other form of communication channel that provides bi-directional communication.

The ports 720 may also include an audio input device, such as a microphone, that is communicatively connected to the media system 7000. The connection may be a cable for providing a direct electrical connection between the audio input device and the media system 7000, or the connection may be a fiber optic cable or a radio transmitter and corresponding receiver.

The audio input device enables the presenter to input speech commands and oral presentation information to the media system 7000. The speech commands provide instructions to the data processing subsystem 710 for retrieving and transferring informational data, instructions to the media subsystem 790 to adjust the parameters of an imaging system 760 or an audio system 780, and to instruct the media system 7000 to retrieve informational data from a connected network.

The oral presentation information is audio information that the presenter is conveying directly to the audience. This oral presentation information is reproduced by the audio system 780.

Image informational data retrieve from the data processing subsystem 710 or the network is reproduced by imaging system 760. The imaging system 760 may be an image projection system or a direct video display system such a cathode ray tube or other type of display device.

The media system 7000 also includes a speech recognition subsystem ("SRSS") 770 is connected to the media subsystem 790. The SRSS 770 monitors the input from ports 720 to identify predetermined speech commands and predetermined speech file names. Upon proper identification of a predetermined speech command and associated predetermined speech file name, the SRSS 770 sends instruction to the media subsystem 790 indicating the identification of a predetermined speech command and associated predetermined speech file name in parallel to the speech/audio data.

The media subsystem 790 processes the instruction from the SRSS 770 and sends appropriate commands to the data processing subsystem 710, or network. Moreover, the parallel speech/audio data is sent to the audio system 780 for reproduction by the audio system 780.

As set forth above, one embodiment of the present invention is a media system. This embodiment includes a data-processing system to provide informational data and a media device, communicatively connected to the data processing system, to convert the informational data from the data processing system into information that is human-perceivable. The media device includes a speech recognition system to recognize human speech and to convert predetermined portions of the received human speech into commands, the commands providing instructions to the data-processing system to enable speech driven control of a media presentation, and a display to display images from the informational data.

The media device also includes an audio system to produce sound from the informational system. The media device may also include a transducer system to receive human speech and to convert the human speech into electrical signals representative of the received human speech, the electrical signals being processed by the speech recognition system to recognize the received human speech.

On the other hand, media device may include a first transducer system to receive human speech and to convert the human speech into infrared signals representative of the received human speech and a second transducer system to receive transmitted infrared signals and to convert the received infrared signals representative of the received human speech into electrical signals representative of the received human speech, the electrical signals being processed by the speech recognition system to recognize the received human speech; or a first transducer system to receive human speech and to convert the human speech into light pulses representative of the received human speech and a second transducer system to receive transmitted light pulses and to convert the received light pulses representative of the received human speech into electrical signals representative of the received human speech, the electrical signals being processed by the speech recognition system to recognize the received human speech.

The media device includes an audio input for receiving signals representing electrically transduced human speech, the audio input providing parallel input of the received signals to the speech recognition system and an audio system; or an audio input for receiving light pulses representing optically transduced human speech, the audio input converting the received light pulses into electrical signals and providing parallel input of the electrical signals to the speech recognition system and an audio system.

The speech recognition system converts the recognized human speech into a first set of commands and into a second set of commands, the first set of commands providing instructions to the data-processing system to enable speech driven control of a media presentation, the second set of commands providing instructions to the media device to enable speech driven control of a functionality of the media device. The first set of commands includes at least one command from a group of commands comprising a next slide command, a previous slide command, a retrieve file command, a start video command, a pause video command, a stop video command, an advance back video command, an advance forward video command, a start audio command, a pause audio command, a stop audio command, an advance back audio command, and an advance forward audio command; and the second set of commands includes at least one command from a group of commands comprising focus commands, sharpness commands, color commands, brightness commands, display shift commands, and audio commands.

In another embodiment, the present invention is a media device including a display device to convert informational data from a data processing system into information that is human-perceivable and a speech recognition system to recognize human speech and to convert predetermined portions of the received human speech into commands, the commands enabling speech driven control of a media presentation.

A third embodiment of the present invention is a speech-driven control device for a media system including a housing; a controller; a first communication port to enable communication of instructions between a data processing system and the controller; and a second communication port to enable communication of instructions between a media device and the controller. The controller includes a speech recognition system to recognize human speech and to convert the human speech into a first set of commands and into a second set of commands, the first set of commands providing instructions to the data-processing system to enable speech driven control of a media presentation, the second set of commands providing instructions to the media device to enable speech driven control of a functionality of the media device. The controller and the data processing system may be in communication via an electronic cable, the electronic cable being connected to the first communication port. Moreover, the controller and the media device may be in communication via an electronic cable, the electronic cable being connected to the second communication port. Furthermore, the controller and the data processing system may in communication via optical signals, the first communication port being an optical port; and the controller and the media device may be in communication via optical signals, the second communication port being an optical port.

A further embodiment of the present invention is a media system including a personal digital assistant device having a digital file stored therein and a media device, in communication with the personal digital assistant device, to convert the digital file from the personal digital assistant device into information that is human-perceivable. The media device and the personal digital assistant device may be in communication via an electronic cable, optical signals, or infrared light signals.

A further embodiment of the present invention is a media system including a data-processing subsystem to provide informational data; a media subsystem to convert the informational data from the data processing system into information that is human-perceivable; and a speech recognition subsystem to recognize human speech and to convert predetermined portions of the received human speech into commands. The commands provide instructions to the data-processing subsystem to enable speech driven control of a media presentation. The media subsystem includes an imaging system to display images from the informational data and an audio system to produce sound from the informational data.

While various examples and embodiments of the present invention have been shown and described, it will be appreciated by those skilled in the art that the spirit and scope of the present invention are not limited to the specific description and drawings herein, but extend to various modifications and changes all as set forth in the following claims.

What is claimed is:

1. A media system, comprising:
a data-processing system, having a first housing, to provide informational data;
a media device having a second housing; and
a communication channel to provide bi-directional communication between said data-processing system and said media device;
said first and second housings being non-integral;
said media device converting said informational data from said data processing system into information that is human-perceivable;
said media device including,
a speech recognition system, located within said second housing, to recognize human speech and to convert predetermined portions of the received human speech into commands, said commands being communicated to said data-processing system via said communication channel to enable speech driven control of a media presentation,
an imaging system, located within said second housing, to display images corresponding to said informational data,
a first transducer system, located without said second housing, to receive human speech and to convert the human speech into infrared signals representative of the received human speech, and
a second transducer system, located within said second housing, to receive transmitted infrared signals and to convert the received infrared signals representative of the received human speech into electrical signals representative of the received human speech, said electrical signals being processed by said speech recognition system to recognize the received human speech.

2. The media system as claimed in claim 1, wherein said media device includes an audio system, located within said second housing, to produce sound corresponding to said informational system.

3. The media system as claimed in claim 1, wherein said media device includes a transducer system, located without said second housing, to receive human speech and to convert the human speech into electrical signals representative of the received human speech, said electrical signals being processed by said speech recognition system to recognize the received human speech.

4. The media system as claimed in claim 1, wherein said imaging system is a projection display device.

5. The media system as claimed in claim 1, wherein said imaging system is a non-projection display device.

6. The media system as claimed in claim 1, wherein said data-processing system is a personal computer.

7. The media system as claimed in claim 1, wherein said media device includes an audio input, located within said second housing, for receiving signals representing electrically transduced human speech, said audio input providing parallel input of the received signals to said speech recognition system and an audio system.

8. The media system as claimed in claim 1, wherein said media device includes an audio input, located within said second housing, for receiving light pulses representing optically transduced human speech, said audio input converting the received light pulses into electrical signals and providing parallel input of the electrical signals to said speech recognition system and an audio system.

9. The media system as claimed in claim 1, wherein said speech recognition system converts the recognized human speech into a first set of commands and into a second set of commands, said first set of commands providing instructions to said data-processing system to enable speech driven control of a media presentation, said second set of commands providing instructions to the media device to enable speech driven control of a functionality of the media device.

10. The media system as claimed in claim 9, wherein said first set of commands includes at least one command from a group of commands comprising a next slide command, a previous slide command, a retrieve file command, a start video command, a pause video command, a stop video command, an advance back video command, an advance forward video command, a start audio command, a pause audio command, a stop audio command, an advance back audio command, and an advance forward audio command.

11. The media system as claimed in claim 9, wherein said second set of commands includes at least one command from a group of commands comprising focus commands, sharpness commands, color commands, brightness commands display shift commands, and audio commands.

12. A media system, comprising:
   a data-processing system, having a first housing, to provide informational data;
   a media device having a second housing; and
   a communication channel to provide bi-directional communication between said data-processing system and said media device;
   said first and second housings being non-integral;
   said media device converting said informational data from said data processing system into information that is human-perceivable;
   said media device including,
      a speech recognition system, located within said second housing, to recognize human speech and to convert predetermined portions of the received human speech into commands, said commands being communicated to said data-processing system via said communication channel to enable speech driven control of a media presentation,
      an imaging system, located within said second housing, to display images corresponding to said informational data,
      a first transducer system, located without said second housing, to receive human speech and to convert the human speech into light pulses representative of the received human speech, and
      a second transducer system, located within said second housing, to receive transmitted light pulses and to convert the received light pulses representative of the received human speech into electrical signals representative of the received human speech, said electrical signals being processed by said speech recognition system to recognize the received human speech.

* * * * *